APPARATUS FOR ADJUSTING THE POSITIONS OF MAGNETIC HEADS

Filed Oct. 10, 1961 2 Sheets-Sheet 1

United States Patent Office 3,286,041

Patented Nov. 15, 1966

3,286,041

APPARATUS FOR ADJUSTING THE POSITIONS OF MAGNETIC HEADS

Yoshiro Nishiwaki, Kanagawa-ku, Yokohama, Japan, assignor to Victor Company of Japan, Ltd., Yokohama, Japan, a corporation of Japan Filed Oct. 10, 1961, Ser. No. 144,211

Claims priority, application Japan, Nov. 7, 1960, 35/44,806

1 Claim. (Cl. 179—100.2)

This invention relates to an apparatus for adjusting the fitting positions of a plurality of magnetic heads fitted to a rotary disk in a magnetic recording and reproducing apparatus for magnetically recording and reproducing such signals of high frequencies as video signals by scanning a magnetic tape with a plurality of such magnetic heads fitted to the rotary disk.

An object of the present invention is to provide an apparatus wherein the fitting positions of respective magnetic heads for a rotary disk can be adjusted quickly, accurately and easily.

The invention will now be described with reference to the accompanying drawing, in which FIGURE 1 is a partly sectioned side view of an apparatus of the present invention FIGURE 2 is a plan view of the above mentioned apparatus.

Figure 1:
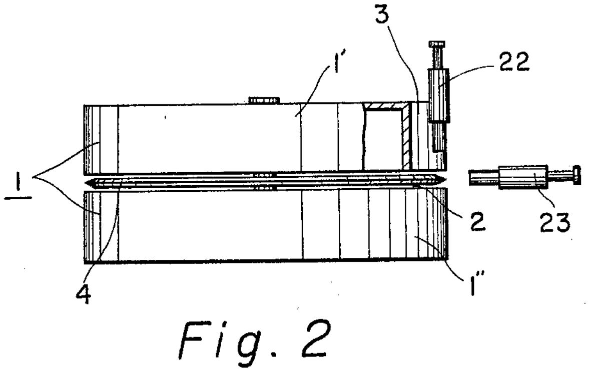
Figure 2:
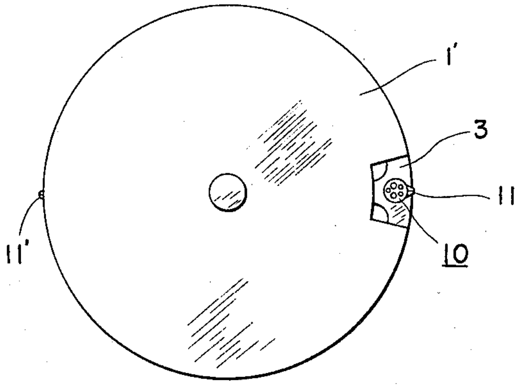
Figure 3:
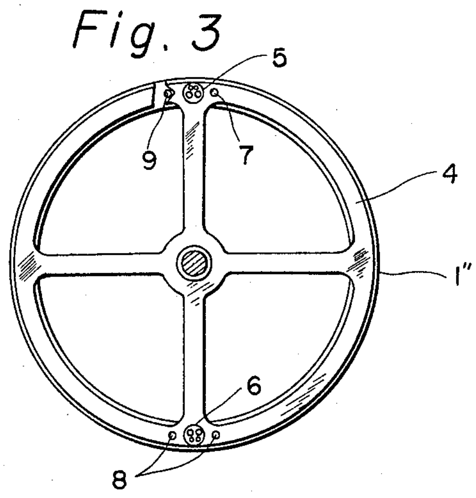
FIGURE 3 is a plan view of a guide drum with the upper half part removed.

In the drawings, 1 is a guide drum divided into two parts 1' and 1'', 2 is a clearance formed in the middle of said guide drum, 3 is a adjustment slot made in a part of the periphery of the upper half part 1' of the guide drum 1 and 4 is a rotary disk in the peripheral edge part of which are made circular recesses 5 and 6 for fitting magnetic head blocks mentioned hereinafter. 7 and 8 are reference holes made on both sides of said circular recesses 5 and 6, respectively. 9 is a reference hole bored correctly in the peripheral edge part of the lower half part 1'' of the guide drum 1 so as to perfectly coincide with the reference holes 7 and 8 made in said rotary disk when the disk comes on the lower part of the guide drum.

Figure 4:
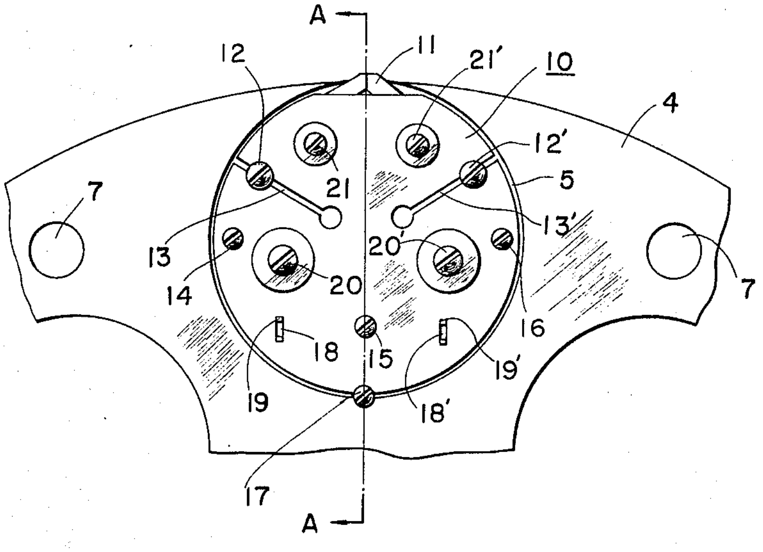
FIGURE 4 is a magnified plan view of a magnetic head block in said apparatus.
Figure 5:
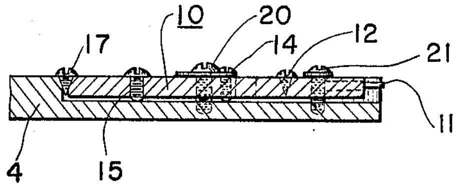
FIGURE 5 is a sectioned view on line A—A in FIGURE 4.

10 is a magnetic head block provided with such position adjusting mechanism as is described below. That is to say, in FIGURES 4 and 5, 11 is a magnetic head tip and, 12 and 12' are tapered adjusting screws for adjusting the lateral displacement of said head tip and to be screwed in the form of wedges into cut grooves 13 and 13', respectively, made on both sides of said magnetic head tip 11. 14, 15 and 16 are adjusting screws for adjusting the vertical displacement and inclination of the head tip 11. 17 is a tapered adjusting screw for adjusting the movement of the head tip 11 in the radial direction of the roary disk 4. 18 and 18' are square dowel pins set in the circular recesses 5 in said rotary disk 4. 19 and 19' are rectangular holes fitted to the square dowel pins 18 and 18', respectively. They are to correctly define the fitting position of each magnetic head block 10. 20, 20', 21 and 21' are set screws for fixing the magnetic head block 10 in the circular recess 5. 22 is a microscope longitudinally disposed with respect to guide drum 1 and trained against the magnetic head block 10. 23 is another microscope trained against the peripheral surface of the magnetic head block 10.

A magnetic tape (not illustrated) is diagonally wound and fitted on substantially half the peripheral surface of the guide drum 1 formed as described above, and said rotary disk 4 is rotated so that the head tip 11 fitted to said rotary disk and the head tip 11' opposed to said tip 11 may diagonally scan the magnetic tape for a comparatively long time to magnetically record or reproduce video signals.

In such case, as the magnetic head tips 11 and 11' will scan the magnetic tape and will be alternately switched, it will be necessary to adjust the positions of such head tips so as to be arranged correctively in symmetrical positions.

The present invention relates to an apparatus for making such adjustment as is mentioned above. Such adjustment is made chiefly in the case that the magnetic head block 10 provided with the head tip 11 or 11' has been replaced due to the wear of said head tip or in the case that the position of the head tip 11 or 11' has become out of order during use. For example, the case of replacing the magnetic head block 10 shall be explained in the following. First of all, the reference holes 7 made in the said rotary disk 4 are made to meet the reference holes 9 made in the guide drum 1. Set pins (not illustrated) to fit perfectly in close contact in such holes are fitted into such reference holes so as to fix the rotary disk 4 and guide drum 1 together. Then the magnetic head block 10 is inserted into the circular recess 5. The square dowel pins 18 and 18' are fitted into the rectangular holes 19 and 19', respectively. The block is thus secured in the determined position by means of the set screws 20, 20', 21 and 21'.

The state of the horizontal and vertical positions of the head tip 11 are correctly memorized or recorded by means of the microscopes 22 and 23 as shown in FIGURE 1. Then said set pins are removed and the reference hole 8 near the other magnetic head block (not illustrated) located in a position symmetrical at 180 degrees with said magnetic head block 10 is made to meet the reference hole 9 of said guide drum 1. Here, the same as in the above mentioned case, set pins to fit perfectly in close contact in the respective reference holes 8 and 9 are inserted into such reference holes so as to fix the guide drum 1 and rotary disk 4 together. While the head tip 11' is being watched by means of said microscopes 22 and 23 so as to be set in the same state as the fitting position of said head tip 11, the vertical, horizontal and also forward and rearward positions of the head tip 11' are adjusted by means of the respective adjusting screws 12, 12', 14, 15, 16 and 17. Thus the two above mentioned head tips 11 and 11' will be adjusted and fixed in the perfectly symmetrical positions.

In the above mentioned embodiment, the relative positions of the magnetic head blocks are normalized by means of the respective reference holes made in the guide drum and rotary disk. However, the means is not limited to them. For example, proper indices may be provided in the guide drum and rotary disk so as to meet each other. Also it is needless to say that the fixing means by said set pins for the guide drum and rotary disk is not limited thereto but may be any other possible means. Further, in the above mentioned embodiment, the magnetic head blocks are explained as two. However, they are not limited to the two but more may be used.

According to the present invention, as explained in the above, a rotary disk having a plurality of magnetic head tips and so many indices is rotatably fitted in a guide drum having indices correctly meeting said indices so that, when any of the indices in said rotary disk is made to meet the index in said guide drum, the position of said head tip may be determined and memorized or recorded and, when the index of the other head tip operating as related with said head tip is made to meet the index in said guide drum, the position of said other head tip may be adjusted in accordance with the above mentioned memory or record so as to be in the same state as of the position of the head tip whose position has been previously determined. Therefore, the positions of a plurality of head tips operating as related with one another can be adjusted quickly, accurately and very easily.

What I claim is:

An apparatus for adjusting the positions of magnetic heads comprising a guide drum for guiding a magnetic tape;

a rotary disk positioned for rotation in said drum;

a pair of magnetic head blocks adjustably fitted to the peripheral edge of said rotary disk said magnetic head blocks being opposed to each other in the diametral direction to the peripheral edge of said rotary disk, each magnetic head block including a magnetic head tip projecting slightly from said rotary disk so as to be in contact with such magnetic tape;

a mechanism for adjusting the position of said magnetic head block on said rotary disk;

a pair of reference holes through said rotary disk near said magnetic head blocks on the peripheral edge of said rotary disk, said reference holes being opposed to each other in the diametral direction;

a pair of reference holes in the guide drum coinciding with said reference holes through said rotary disk in a fixed rotary position of said rotary disk;

two microscopes positioned separately from said guide drum and rotary disk so that with said microscopes the positions of said magnetic head tips can be observed to be compared with each other, said microscopes being arranged at an angle of 90 degrees with respect to each other;

set pins having a tight fit in the reference holes in said disk and said drum whereby to fix said disk and said drum together; and means for adjusting the positions of said magnetic head blocks on said rotary disk.

References Cited by the Examiner

UNITED STATES PATENTS

| | | | |
|---|---|---|---|
| 2,540,406 | 2/1951 | Ranger | 179—100.2 |
| 2,574,707 | 11/1951 | Pettus et al. | 179—100.2 |
| 3,020,359 | 2/1962 | Pfost | 179—100.2 |
| 3,039,102 | 6/1962 | Fuller et al. | 179—100.2 |

BERNARD KONICK, *Primary Examiner.*

IRVING SRAGOW, *Examiner.*

M. S. GITTES, *Assistant Examiner.*